E. C. COOPER.
Evaporator.
8821X
Patented May 16, 1835
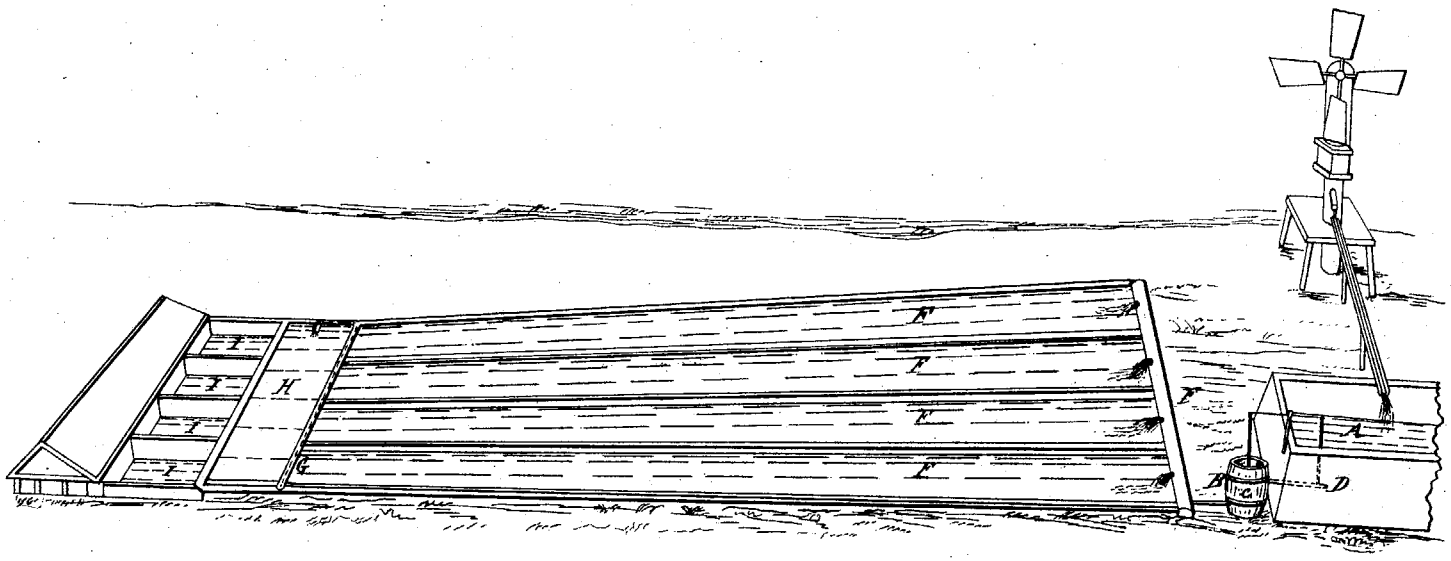
AM. PHOTO-LITHO.CO. N.Y. (OSBORNE'S PROCESS.)

May 16 · 1835 515.

8821X

Edward C. Cooper of the City, County & State of N.Y.

Letters Patent.

The schedule referred to in these Letters Patent & making part of the same, containing a description in the words of the said Edward C. Cooper, himself of his improvement in the manufacture of Salt by solar evaporation To all to whom these presents shall come Be it known, that I. Edward C. Cooper of the City, County and State of New York, have invented a new and useful improvement in the manufacture of salt by solar evaporation, and that the following is a full and faithful description of the construction and operation of said process as invented by me, This improvement consists in the successful application of an Inclined Plane Surface, to the evaporating of Ocean Water or other brines to a saturated brine while flowing down, the said inclined plane surface and also of the Means by which this is rendered practical. These means consist first in making a water tight surface by means of coating the natural surface with cement, 2d the means for the even distribution of the salt water over the inclined plane surface and 3d the means for regulating the quantity of salt water running on to the quantity evaporated while flowing down, the inclined plane surface; The above salt works are to be constructed in the following manner, — Ground having a southerly aspect & a descent of from one to four inches in every ten feet being selected, and the extent of the intended inclined plane surface, being marked out at the top and at the bottom of this intended inclined plane surface, two horizontal lines or levels are to be made on the ground parallel with each other and about two hundred feet apart, and the lower line or level to be from two to six feet lower than the line parallel with it at the top, Between the above two lines or levels the whole

8821X whole ground is to be evenly graded to a level plane regularly descending
from the top line or level down to the line or level at the bottom; The sur-
face being thus reduced to a regular inclined plane, trenches are then to be
dug, perpendicularly from the top to the bottom, of the inclined plane sur-
face, these trenches to be about four feet apart and one foot deep for
draining the ground of superfluous moisture &c. The ground being made
an inclined plane surface is now to be coated with a moderately stiff
mortar composed of one part of hydraulic cement to two of clean sand
The mortar to be carefully laid on by a trowel roller &c. to the depth of
one half an inch & raised on the edges one inch, when the cement has
become well hardened, it is to be washed over with a thin coat of cement
to close all fissures or holes. These being stoped and the cement being
firmly set, the whole inclined plane surface is to be evenly strewed
with gravel one fourth inch deep, which gravel constitutes the means
for the even distribution of the water over the inclined plane surface
while flowing down. At the top of the inclined plane surface is to be
placed a cistern of ordinary construction and of any size that may be
practically required, the bottom of said cistern to be about two feet above
the top of the inclined plane surface. Upon a level with the top of
the inclined plane surface and projecting half way under the cistern
aforesaid is to be a water tight tub holding about 100 gallons, and being
about two feet high. Immediately over the part of the tub (deno-
minated the regulating tub) projecting under the cistern aforesaid
is to be a hole in the bottom of the cistern one or more inches in diame-
ter, upon this hole in the bottom of the cistern is a valve to be
placed, connected by a rod to a lever attached to the upper
edge of the cistern or reservoir and from the other end of the lever
another rod is attached, which rod projects down into the regulating
tub, aforesaid and upon this last rod is a moveable float of wood
and to be fastened at any required length on the rod aforesaid.
Along the whole extent of the top of the inclined plane surface, runs
a bored log or logs, which communicate with the regulating tub
aforesaid. Into these logs opposite the ends of each single breadth of plane between the ditches one or more holes are to be bored and then plugged with lead and through each of these lead plugs a hole one fourth inch in diameter is to be bored. The valve and float (which may be constructed in any practical method, together with the regulating tub and the aperture in the logs aforesaid together constitute the means for regulating the quantity of salt water flowing on to the quantity evaporated from the inclined plane surface in the same given time.

At the bottom of the inclined plane surface runs a gutter to receive the brine running off and convey it to pickle and salt rooms of ordinary construction and equal in extent of surface to one sixth part of the inclined plane surface. Having completed the structure of the inclined plane surface as well as all the parts necessary thereto, as herein before described, it is put into operation by pumping salt water or brine into the cistern from which it flows into the regulating tub, before mentioned and from the regulating tub into the logs and through the apertures before stated in them, — out upon the inclined plane surface, The float in the regulating tub, being fixed on the rod as already described at any required length the salt water rises in the regulating tub aforesaid and the float with it to the required length when it closes the valve in the cistern by means of the lever to which they are attached as herein before described, until a portion of the water in the regulating tub has run out and again lowered the float and thus reopened the valve aforesaid and thus by means of the valve, and float the water can be constantly kept at any required height in the regulating tub, by raising or lowering the float upon the rod to which it is attached, The level of water in the regulating tub accurately regulates the quantity flowing through the apertures in the logs and the salt water flowing on the inclined plane surface can at any time be regulated to the quantity evaporated from said surface by raising or lowering the float upon the rod in the regulating tub, The salt water flowing on to and down the inclined plane surface is evenly and equally distributed over the same by means of the affinity

8821X the water has for the gravel upon said inclined plane surface as before mentioned, The remaining nearly saturated brine flow-ing off the inclined plane surface runs into the gutter before mentioned and is by it conveyed into the covered pickle rooms and salt rooms for final crystallization of salt. At night and at all times when there is no evaporation the salt water or brine in the cistern is shut off by fixing the valve down, upon the hole in the bottom of the cistern aforesaid, During rains, the communication between the gutter & pickle rooms is also to be closed; in any practical way that the rain water &c falling on the inclined plane surface may flow away. The improvements in the manufacture of Salt as above described and for which Letters Patent are hereby claimed consists first, the successful application of an inclined plane surface as herein described to the evaporating salt water or brine to a nearly saturated brine while flowing down the said plane. 2d, The successful application of a valve and float in a regulating tub as described herein for regulating the quantity of water flowing on to inclined plane surface by means of a regulated level of water in the regulating tub, 3, The equal distribution of the salt water over the inclined plane surface by means of the gravel spread on said plane as before described 4. The successful application of a cemented water tight surface upon a natural soil by means of coating the same with Hydrau-lic cement as herein before described as successfully applicable to the construction of salt pans with level bottom sides as well as to inclined plane surfaces.

Witnesses
Peter Cooper
Ebenezer, Conklin

Edw. C. Cooper

Exd
[illegible]

(Patented 16 May 1838)

[1440 words (Drawing)